United States Patent
Wei

[11] Patent Number: 5,317,246
[45] Date of Patent: May 31, 1994

[54] DEVICE FOR CONTROLLING THE TORQUE OF AN ASYNCHRONOUS ELECTRIC MOTOR BY CONTROLLING THE PHASE OF THE MOTOR STATOR VOLTAGE

[75] Inventor: Liming Wei, Villeurbanne, France

[73] Assignee: GEC Alsthom SA, Paris, France

[21] Appl. No.: 980,707

[22] Filed: Nov. 24, 1992

[30] Foreign Application Priority Data

Nov. 29, 1991 [FR] France ............... 91 14806

[51] Int. Cl.$^5$ ............................... H02P 7/00
[52] U.S. Cl. ........................ 318/432; 318/805
[58] Field of Search ............ 318/432, 798-812

[56] References Cited

U.S. PATENT DOCUMENTS

| | | | |
|---|---|---|---|
| 4,607,206 | 8/1986 | Sember et al. | 318/798 |
| 4,724,373 | 2/1988 | Lipo | 318/805 |
| 4,767,976 | 8/1988 | Mutoh et al. | 318/808 |
| 4,800,327 | 1/1989 | Fujioka et al. | 318/798 |
| 4,926,105 | 5/1990 | Mischenko et al. | 318/800 |
| 5,010,288 | 4/1991 | Poline | 318/811 |

FOREIGN PATENT DOCUMENTS 0388845 9/1990 European Pat. Off. .
3820125 12/1988 Fed. Rep. of Germany .

OTHER PUBLICATIONS

Automatisierungstechnische Praxis, vol. 29, No. 2, 1987, Munich, Germany, pp. 83-88; K. Klausecker et al: "Eine neue Generation digital geregelter Drehstrom-Hauptspindelantriebe".

Primary Examiner—Jonathan Wysocki
Attorney, Agent, or Firm—Sughrue, Mion, Zinn, Macpeak & Seas

[57] ABSTRACT

A device controls the torque of an asynchronous electric motor by controlling the phase of the motor stator voltage relative to a motor flux on the basis of a set point for the quadrature component of the stator current in a frame of reference related to the flux in turn derived from the motor torque set point. The device includes a first difference detector for detecting any difference between the set point and the current value of the quadrature component and a first regulator operating on the basis of the difference to provide the phase value to be applied to the motor to reduce the difference.

4 Claims, 2 Drawing Sheets

DEVICE FOR CONTROLLING THE TORQUE OF AN ASYNCHRONOUS ELECTRIC MOTOR BY CONTROLLING THE PHASE OF THE MOTOR STATOR VOLTAGE

BACKGROUND OF THE INVENTION

1. Field of the invention

The present invention concerns controlling the torque of an asynchronous electric motor.

2. Description of the prior art

The stator of an asynchronous electric motor is usually energized by an inverter A known way to control the torque by a so-called scalar method is to operate on the stator voltage amplitude and frequency.

Controlling the amplitude of the stator voltage at constant frequency is equivalent to controlling the rotor flux, and controlling the stator frequency at constant rotor torque is equivalent to controlling the quadrature component of the stator current in a frame of reference related to the rotor flux.

It is also known to control the phase of the stator voltage relative to the rotor flux instead of controlling the stator frequency, this so-called "vector" control providing a quicker response.

A vector control system of this kind is described in French patent application N0 89 03685 corresponding to U.S. Pat. No. 5,010,288.

In this system a magnitude referred to as the set point ($\alpha$cons) for the stator voltage phase relative to the rotor flux is obtained from regulated components Ud and Uq of the stator voltage respectively corresponding to the phase and quadrature components of the stator voltage in a frame of reference related to the rotor flux.

The regulated components Ud and Uq are respectively obtained from two regulators respectively receiving the rotor flux set point ($\alpha$rcons) and the stator current quadrature component set point (Iqcons), the two set point values crcons and Iqcons being in turn derived from the motor torque set point.

The resulting phase set point is then compared with the current phase and if there is any difference the current stator frequency is corrected to reduce the difference.

The regulated components Ud and Uq obtained from the two regulators are also used to supply the modulus of the stator voltage to be applied to the inverter and the corrected stator frequency using a pulse width modulator to obtain the motor torque set point.

This vector control system is therefore limited to situations in which phase regulation is accompanied by modulus regulation, that is to say to situations in which the motor operates at low speeds, since it is known that modulus (i.e flux) regulation cannot be used at high speeds, when the inverter is saturated (which may be due to the minimum conduction time of the inverter power component) or when the inverter operates under so-called "full wave" conditions.

SUMMARY OF THE INVENTION

An object of the present invention is a vector control system with no such limitation which can therefore be used for operation at low speed and for operation at high speed.

The present invention consists of a device for controlling the torque of an asynchronous electric motor by controlling the phase of the motor stator voltage relative to a flux in the motor on the basis of a set point for the quadrature component of the stator current in a frame of reference related to said flux in turn derived from the motor torque set point, the device comprising:

first difference detecting means for detecting any difference between said stator current set point and the current value of said quadrature component, and first regulator means operating on the basis of said difference to provide the phase value to be applied to said motor to reduce said difference.

Other objects and features of the present invention will emerge from the following description of one embodiment given with reference to the appended drawings.

DETAILED DESCRIPTION OF THE INVENTION

Figure 1:
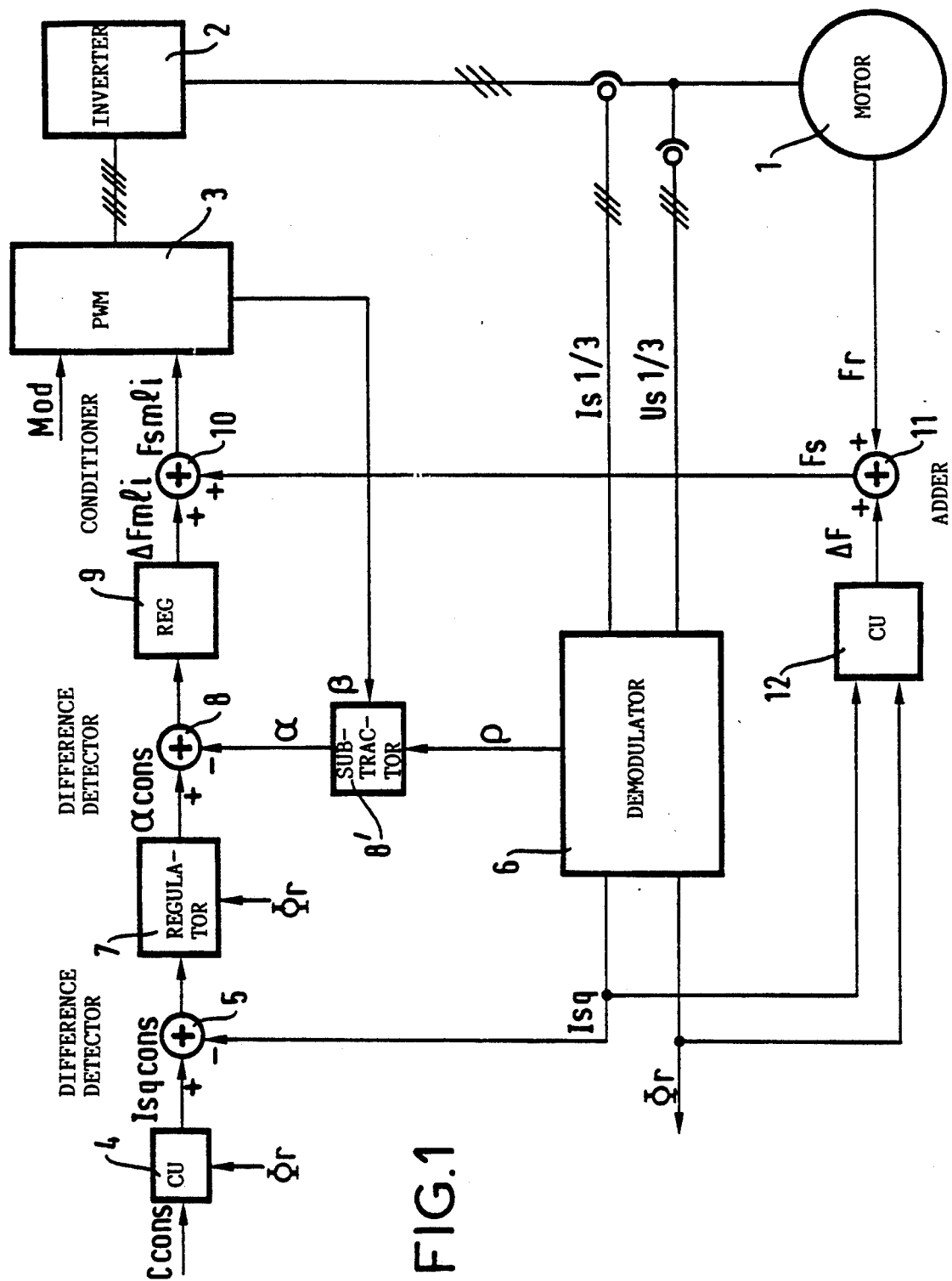
FIG. 1 is a block diagram of one embodiment of a torque control device in accordance with the invention.

FIG. 1 shows diagrammatically a motor 1 controlled by an inverter 2 controlled by a Pulse Width Modulator (PWM) 3 which receives two magnitudes Mod and Fsmli respectively representing the modulus and the frequency of the stator voltage to be applied to the motor 1 via the components 2 and 3.

Because the invention applies equally to operation at low and high speeds, the magnitude Mod may be a constant value or regulated (by any conventional method) to maintain the flux in the motor constant at low speed; this is why the manner in which this magnitude is produced is not indicated in the figure.

To produce the magnitude Fsmli, a Calculator Unit (CU) 4 derives a set point for the quadrature component Isqcons of the stator current Isq from the torque set point Ccons and the measured rotor flux or by applying the following equation derived from the operating equations of the motor:

$$Ccons = Po. (Lm/Lr)\phi cr. Isqcons$$

in which Lm is the cyclic mutual inductance between the stator and the rotor of the motor, Po is the number of pairs of poles in the motor and Tr=Lr/Rr where Lr is the cyclic inductance of the rotor and Rr is the rotor resistance per motor phase.

The difference between the set point magnitude Isqcons and the current magnitude Isq is determined in a difference detector 5. The current magnitude Isq is obtained at the output of a demodulator 6 usually employed to calculate the magnitudes $\phi$or and Isq from stator current and voltage measurements Is ⅓ and Us ⅓ for each motor phase. The magnitude $\phi$or obtained in this way is that used by the calculator unit 4.

The difference at the output of the difference detector 5 is applied to a regulator 7 which determines the set point value ocons of the stator voltage relative to the rotor flux to be applied to the motor to reduce the measured difference.

The regulation mechanism employed by the regulator 7, which may be conventional, tends to reduce this difference because there exists between the magnitudes $\alpha$ and Isq a relationship which may be derived as follows.

From the operating equations of the motor, under steady state conditions:

$$Vsd = Rs.Isd - \sigma. Ls. ws. Isq$$

$$Vsq = Rs.Isq + Ls/Lm. ws.\phi r$$

where:

Vsd and Vsq are the direct and quadrature components of the stator voltage in the frame of reference related to the rotor flux, Isd and Isq are the direct and quadrature components of the stator current in the same frame of reference, Rs is the stator resistance per motor phase, Ls is the cyclic inductance of the stator, ws is the stator angular frequency $ws = 2\pi Fs$ where Fs is the stator frequency, $\sigma$ is a dispersion coefficient:

$$\sigma = 1 - Lm^2/Ls.Lr$$

the magnitudes $\phi r$, Lm, Lr being as defined previously.

Further:

$$\tan \alpha = Vsd/Vsq$$

whence:

$$\tan \alpha = \frac{Rs \cdot Isd - \sigma \cdot Ls \cdot ws \cdot Isq}{Rs \cdot Isq + (Ls/Lm) \cdot ws \cdot \phi r}$$

For a high angular frequency ws, the ohmic drop is neglible, whence $$\tan \alpha = \frac{-\sigma \cdot Ls \cdot ws \cdot Isq}{(Ls/Lm) \cdot ws \cdot \phi r} = \frac{-\sigma \cdot Lm \cdot Isq}{\phi r}$$

whence:

$$\alpha = \frac{\pi}{2} + \arctan \frac{\sigma Lm \cdot Isq}{\phi r} \quad (1)$$

For a given motor supply voltage, the flux $\phi r$ being constant, the angle $\alpha$ is therefore a function of Isq.

Note further, given equation (1), that the magnitude $\phi r$ may be used to modify the gain of the regulator 7.

Figure 2:
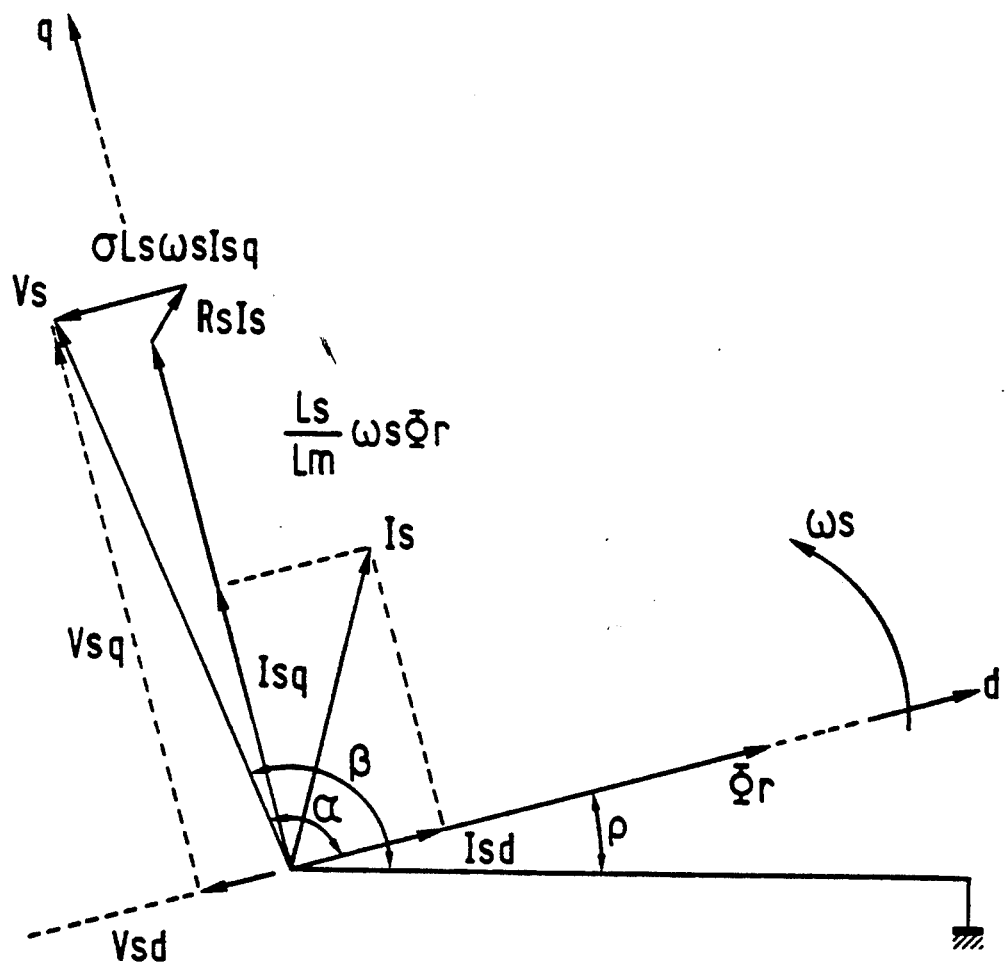
FIG. 2 is a vector diagram showing various magnitudes or parameters relevant to the operation of a device of this kind.

The difference between the magnitude ocons obtained in this way and the current magnitude $\alpha$ is determined in a difference detector 8, the current magnitude $\alpha$ being obtained by subtracting from an angle $\beta$ representing the position of the voltage Vs in a frame of reference related to the stator, an angle $\rho$ representing the position of the flux $\phi r$ in the same frame of reference, as indicated in the FIG. 2 diagram, this subtraction being carried out in a subtractor 8'.

The angles $\beta$ and $\rho$ are respectively supplied by the pulse width modulator 3 and the demodulator 6 in a known manner that need not be described again here.

The difference obtained at the output of the difference detector 8 is applied to a regulator 9 which determines the correction $\Delta$Fsmli to be applied to the current frequency Fsmli to reduce the difference.

The regulator 9 also uses a regulation mechanism that may be conventional and so does not need to be described again.

The correction $\Delta$Fsmli is then added in a conditioner 10 to the current stator frequency Fs to produce the required stator frequency Fsmli.

The current frequency Fs is obtained at the output of an adder 11 which adds the measured rotor rotation frequency Fr times P0 (P0 is the number of pairs of poles in the motor) to the slip $\Delta$F of the motor defined by the equation:

$$\Delta F = Fs - Fr$$

The slip $\Delta$F is calculated from the magnitudes Isq and $\phi r$ from the demodulator 6 in a calculator unit (CU) 12 using the following equation deduced from the operating equations of the motor:

$$Lm. Isq = Tr.\Delta w. \phi r$$

where $\Delta w = 2\pi. \Delta F$
and the magnitudes Lm and Tr are those defined previously.

Note that the regulation mechanism implemented by the components 8, 9 and 10 could be replaced by a simple conversion of the phase ocons into a frequency to obtain the required magnitude Fsmli.

Note also that depending on the nature of the component (here the pulse width modulator 3) used to control the voltage inverter 2, conversion of the phase $\alpha$cons into the frequency Fsmli may not be necessary.

Note also that although the above description refers by way of example to the situation in which the reference for the phase to be regulated is the motor rotor flux, it would be possible to use the motor stator flux or the combined flux as the reference.

There is claimed:

1. Device for controlling the torque of an asynchronous electric motor by controlling only the phase of the motor stator voltage relative to a flux in said motor on the basis of a set point for only the quadrature component of a stator current in a frame of reference related to said flux in turn derived from a motor torque set point, the device comprising:

first difference detecting means for detecting any difference between only said stator current set point and a current value of said quadrature component, and first regulator means operating on the basis of said difference to provide a phase value to be applied to said motor to reduce said difference.

2. Device according to claim 1 further comprising:

second difference detecting means for detecting differences between said phase value supplied by said first regulator means and the current phase value, and second regulator means operating on the basis of the difference detected by said second difference detector means to provide a phase correction to be applied to said motor to reduce said difference.

3. Device according to claim 1 further comprising means for converting said phase value into a frequency value to be applied to said motor.

4. Device according to claim 2 further comprising means for converting said phase correction into a frequency correction to be applied to said motor.

* * * * *